United States Patent [19]

Pinckard et al.

[11] Patent Number: 5,100,455

[45] Date of Patent: Mar. 31, 1992

[54] PROCESS FOR BIOREMEDIATION OF SOILS

[76] Inventors: Joseph A. Pinckard, 10840 Jilinda Ct., San Jose, Calif. 95127; Paul E. Gill, 3131 Homestead Rd., Santa Clara, Calif. 95051

[21] Appl. No.: 545,578

[22] Filed: Jun. 29, 1990

[51] Int. Cl.$^5$ .......................... B08B 7/00; C02F 1/28; C05F 11/02; C05F 11/08
[52] U.S. Cl. .......................................... 71/9; 71/24; 71/901; 71/903; 71/904; 134/7; 210/690; 210/691
[58] Field of Search ....................... 71/9, 901, 903, 24, 71/904; 210/690, 691; 134/7

[56] References Cited

U.S. PATENT DOCUMENTS

| | | |
|---|---|---|
| 2,947,619 | 8/1960 | Gorby . |
| 3,233,976 | 2/1966 | Varro et al. . |
| 3,616,204 | 10/1971 | Linn . |
| 3,762,910 | 10/1973 | Durrell . |
| 3,771,653 | 11/1973 | Harnett ................................ 210/691 |
| 3,953,191 | 4/1976 | Barton ................................. 71/901 |
| 4,050,917 | 9/1977 | Varro . |
| 4,164,405 | 8/1979 | Pinckard . |
| 4,229,442 | 10/1980 | Pinckard . |
| 4,317,670 | 3/1982 | Khoroshavin et al. . |
| 4,494,975 | 1/1985 | De Boodt et al. ......................... 71/9 |
| 4,642,131 | 2/1987 | Hoitink ..................................... 71/9 |
| 4,767,440 | 8/1988 | Salac ....................................... 71/9 |
| 4,849,360 | 7/1989 | Norris et al. . |
| 4,959,154 | 9/1990 | Simmons ............................... 210/691 |

OTHER PUBLICATIONS

Alexander, M., Introduction to Soil Microbiology, 2d ed. John Wiley & Sons, N.Y., 1973, p. 410.
Crawford, J. L., Plant Disease Reporter, vol. 56, p. 328, 1972, "Reduction in yield of cotton caused by parasite dis. in 1971".

Primary Examiner—Wayne A. Langel
Attorney, Agent, or Firm—William S. Ramsey

[57] ABSTRACT

The present invention relates to the protection of the environment, particularly the soil and ground water, by biological degradation of unwanted chemical and biological entities often finding their way into soils. The process of the present invention utilizes the well known methods of the art of composting but specifically selects the raw plant materials to be composted from plant groups having carbon:nitrogen ratios of approximately 10:1 to 30:1 of carbon and nitrogen content. Examples of said special plant material being from members of the plant family Leguminosae, and specifically *Gossypium hirsutum* (cotton). By means of certain modifications of the art of composting said special plant materials, disclosed herein, generate a special humic substrate which supports an indigenous microflora and fauna capable of degrading a number of unwanted substances harmful to man, animals and plants; examples being certain petroleum hydrocarbons, halogenated hydrocarbon pesticides and soil borne plant pathogens. By incorporating said special humic microbial substrate with its contained microorganisms into contaminated soils certain unwanted substances present therein are biologically transformed into harmless end products effectively bioremediating or cleansing said contaminated soils.

13 Claims, No Drawings

PROCESS FOR BIOREMEDIATION OF SOILS

FIELD OF THE INVENTION

The present invention relates to the cleansing of the soil environment of unwanted chemical substances and of biological entities having found their way into soils rendering them harmful to man, animals and plants. By selecting certain plant materials having a narrow carbon:nitrogen ratio, as defined herein, and by modifying the well known art of composting, a biologically active humic substrate is generated which, if incorporated into a contaminated soil, cleanses said soil of certain unwanted contaminants such as the petroleum hydrocarbons, xenobiotic compounds and plant disease causing agents in a time period of a few weeks depending upon seasonal temperatures and concentration of the unwanted entities.

SUMMARY OF THE INVENTION

Leaking oil and chemical storage tanks and supply lines contaminate surrounding soils with petroleum hydrocarbons, industrial solvents and chemicals frequently harmful to man, animals and plants. Current environmental regulations, or laws, demand such contaminated soils either be replaced with clean uncontaminated soil or cleansed of the contaminating entities. Several methods have been developed for the above purpose some of which have been described in U.S. patent documents and elsewhere.

This patent teaches that by composting selected plant material having a carbon:nitrogen ratio of approximately 10:1 to 30:1 a microbially active humic substrate may be generated that supports vast numbers and kinds of soil inhabiting organisms some of which transform certain unwanted chemicals and biological entities into end products generally harmless to man, animals and plants. By selecting certain plant groups, as for example members of the legume family (Leguminosae) such as alfalfa and/or members of the genus Gossypium (cotton) and by modifying the well known art of composting these special plant materials to suit the requirements of the native soil inhabitants needed for degradation of stated unwanted entities and/or soil borne plant pathogens this patent discloses that certain contaminated soils may be reclaimed for agricultural use. By mixing the special compost with the soil to be remediated and planting it with crop plants the time required for completing the process may be reduced.

The principal objective of this patent is disclosure of a process leading to efficient and accelerated cleansing of soils of unwanted entities consisting of a chemical and/or biological nature.

BACKGROUND OF THE INVENTION

Certain agricultural soils, especially in the south, have grown crops almost continuously for more than 100 years. Such soils are now very low in organic matter content and are therefore generally infested with soil borne plant pathogenic fungi represented by the fungal species Rhizoctonia, Pythium and Fusarium among others (Crawford, J. L. 1975. Plant Disease Reporter, 56:373). Such soils are said to be "conducive" to plant disease causing agents. Our experience teaches that such soils low in organic matter remain conductive to plant disease causing agents unless they are amended with a high nitrogen to carbon ratio plant compost material as disclosed in U.S. Pat. Nos. 4,164,405 and 4,229,442, issued to Pinckard, Aug. 14, 1979 and Oct. 21, 1980, respectively. Soils that have been cleansed of plant disease causing agents are said to be made "suppressive". More specifically such soils are also said to be "remediated" although the term currently refers to soils cleansed of unwanted chemical substances. The Pinckard patent, U.S. Pat. No. 4,164,405, p. 5, lines 13-15, states, and we quote . . . "Organic type insecticidal poisons such as toxaphene, DDT, dieldrin or aldrin originally spplied to the growing crop are removed". In that statement Pinckard was referring to the insecticidal residues remaining on the cotton crop waste after it had been separated from the seed and lint by the gin and before the plant material had been composted or otherwise disposed of.

While using multiton quantities of the above described compost for cleansing field crop soils that contained, in addition to plant disease causing agents, 200 ppm of DDT and its isomers, a large pile was left on a garden soil for several weeks before being scattered on the garden. While digging into the soil-compost mix we observed the mix was inhabited by earthworms which are known to be sensitive to the chlorinated aromatic hydrocarbon pesticides. Later tests demonstrated that soils contaminated with several unwanted chemical substances, including soil borne plant pathogens, could be cleansed, or remediated, by mixing with composted (treated) cotton gin waste (or trash) and that the same result could be obtained with composted alfalfa hay but not with cereal straw or common suburban leaf litter. The difference between the raw materials for composting appeared to be their carbon:nitrogen ratios. Those organic raw materials having C:N ratios of approximately 10:1 to 30:1 produced a compost suppressive of soil borne plant pathogens and at the same time, in due course, cleansed the soils of certain unwanted chemical entities. Further research led us to investigate the several well known details of the art of composting in relation to cleansing soils of unwanted entities and to improvements disclosed herein, thus teaching how contaminated soils may be cleansed with composted high nitrogen to carbon ratio plant materials but not with ordinary plant materials or leaf litter such as cereal straw which have C:N ratios approaching 100:1 or more. These facts have not been disclosed heretofore.

Among the first U.S. patent documents reviewed was the Gorby patent, U.S. Pat. No. 2,947,619, issued Aug. 2, 1960 disclosing a process for composting wastes of several kinds by repeated aeration at temperatures of 50° to 70° C. and moisture contents of 40-60%. The Gorby patent while being a disclosure of the prior art bears no relation to our invention for soil remediation.

The Varro, et al., U.S. Pat. No. 3,233,976, issued Feb. 8, 1966, discloses appartus in which organic wastes are converted to fertilizer by aerobic fermentation. It is unrelated to our invention for soil remediation.

The Linn patent, U.S. Pat. No. 3,616,204, issued Oct. 26, 1971, discloses a method for soil restoration (bioremediation) after being contaminated with a petroleum hydrocarbon. The Linn patent discloses, as do several others, inoculating the contaminated soil with cultures of identified microorganisms known to degrade the unwanted contaminants while feeding such organisms appropriate nutrients under controlled laboratory conditions or in the field. The above described approach to soil remediation is likely to be impractical because of soil microbial competition as discussed by Alexander (Alexander, M. 1977. Soil Microbiology, p. 410, "microbial competition", John Wiley & Sons, NY). Many microorganisms compete with each other for nutrients, some protecting themselves by generating antibiotics and while the above hypothesis of soil remediation as delineated by Linn and others may be effective in a sterile substrate it has failed in numerous non sterile substrates as Alexander implies and as my experience has confirmed. For this reason I have turned to the special non sterile substrate as disclosed herein.

The Durrell U.S. Pat. No. 3,762,910, issued Oct. 2, 1973, converts plant nutrients from the passive state to an active state by composting plant material in a trench. It bears no relation to soil remediation as disclosed in our invention.

The Varro patent, U.S. Pat. No. 4,050,917, issued Sept. 27, 1977, discloses a process for composting waste in a heated environment on a series of moving belts and bears no relation to soil remediation.

The Pinckard patents, U.S. Pat. Nos. 4,164,405, issued Aug. 14, 1979, and 4,229,442, issued Oct. 21, 1980, disclosed how cotton crop waste may be cleansed of unwanted identified plant pathogens and chlorinated hydrocarbon insecticides.

The Khoroshavin, et al., patent, U.S. Pat. No. 4,317,670, issued Mar. 2, 1982, remediates industrial waste heaps by leveling, fertilizing, plowing, planting, watering and inoculating with common soil inhabiting fungi; nothing in this invention relates to our claims excepting well known methods of the art.

The Norris, et al., patent, U.S. Pat. No. 4,849,360, issued July 18, 1989, is one of the most recent patents issued for soil remediation. It discloses use of a container for soils contaminated with petroleum hydrocarbons through which air is forced wherein soil remediation depends upon the indigenous microflora after being enriched with phosphorus and nitrogen nutrients.

After reviewing the U.S. patent documents mentioned above and some of the current literature on bioremediation of contaminated soils it is obvious that improvements must include the remediation of unwanted biological entities as well as chemical entities. Another improvement is the identification of specific organic raw materials with suitable carbon:nitrogen ratios for generating the numbers and kinds of oxidative microorganisms necessary for cleansing the soils. A third improvement is the disclosure of the steps necessary for cleansing contaminated soils of unwanted entities.

DETAILED DESCRITION OF THE INVENTION

Large machine cotton pickers harvest the crop and in so doing gather weeds, grasses, soil particles, even small rocks, transporting the harvested crop to a gin where the seed, fiber and debris are separated. The debris or waste, also known as trash, was at one time incinerated but now is accumulated during the harvest season and usually disposed of in dumps and land fills because it contains pesticidal residues.

Cotton gin trash is unique; for years the cotton crop has been sprayed and dusted with pesticides, defoliants and harvest aid chemicals formulated from xenobiotic chemicals, oils and industrial solvents contaminating both the crop residue and soil. The soil microflora and fauna, being repeatedly exposed to low dosages of such chemicals, are known to adapt to and utilize the contained carbon transforming several insecticidal compounds such as DDT to end products harmless to soil inhabiting earthworms and fungus gnats as described herein.

This application discloses that the waste or trash may be easily decomposed and transformed into compost, a dark colored somewhat waxy substance, and the use of such compost to remediate contaminated soil.

PREPARATION OF THE SPECIAL COMPOST

Before soil bioremediation can proceed a special compost must be prepared and mixed with the contaminated soil. The dry waste from the gin is to be arranged in windrows of indefinite lengths 2 to 12 feet wide and 1 to 4 feet high, but preferably 6 to 8 feet wide and 2 to 3 feet high to accommodate practical materials handling equipment. The air dry mass of trash is then dampened with water to bring the mass up to 50 to 90% moisture content based upon original air dry weight, but preferably 60 to 70% being a more practical moisture content. Into the first water applied, for the purpose of encouraging growth and reproduction of the microflora and fauna naturally present in the trash, is dissolved or suspended a carbohydrate such as dextrose, or similar sugar in the amount of approximately 50 to 1,000 ppm based upon estimated total air dry weight of the mass but preferably 100 to 300 ppm being a more practical amount. In the first water to be applied is also dissolved or suspended approximately 50 to 500 ppm of soluble iron such as ferric sulfate, or its equivalent, a preferable amount being 100 ppm of iron as Fe. At this time several of the minor elements for plant growth may also be added to the water in amounts regarded as traces, preferably 1 ppm of the total estimated air dry weight of the mass, and may include for example magnesium, manganese, boron and copper. Nitrogen, phosphorus and potassium are not necessary. The pH should approximate 6.5 to 7.0, preferably 6.8 and may be adjusted with sulfur or calcium as needed.

Well known to microbiologists is the principle that some microorganisms will adapt to increasing concentrations of a specific toxicant if introduced to low dosages. In the present disclosure we have taken advantage of the above principle by adding very low amounts of unwanted toxic substances to said windrows at the time first water was applied. One example being the addition of 50 ppm (wt.) of diesel fuel based upon the dry weight of the starting compost. The exact amount of toxicant added was predetermined by experiment. In the example cited, using diesel fuel, 50 ppm had no harmful effect upon bacteria, fungi, protozoa, nematodes or algae present in the compost that could be identified by microscopic examination. In fact we have isolated and identified the fungal species Mucor and Aspergillus floating on stored diesel fuel. Other compounds such as dichloroethylene were also applied to the starting compost.

In this pre experiment we prepared an aqueous suspension of composted cotton gin trash, passing the vapors of dichloroethylene through the suspension for several days then isolating on agar plates cultures of bacteria and fungi capable of degrading dichloroethylene thus confirming their presence in the special compost.

Following application of the first water, with its contained nutrients and low dosages of unwanted contaminants, the mass should be mixed, moved or turned with appropriate materials handling equipment to allow air penetration and to avoid over-heating. Repeated applications of only water, with repeated mixing must be continued at weekly intervals, more or less, until the individual plant parts such as bracts, seed and stem material are no longer easily identified; the time required being approximately three months in early spring weather, less in mid-summer and more in winter.

The special oxidative microflora and microfauna present in the high nitrogen to carbon plant materials used for bioremediation have been partially identified. However, they represent only a very small number of the total kinds and numbers of microorganisms known to be present. The humic end product brought in intimate contact with the contaminated soil normally contained totals of at least $1 \times 10^8$ individuals per gram of compost. Of the many genera present the following were tentatively identified:

| | |
|---|---|
| Achromobacter | Proteus |
| Arthrobacter | Pseudomonas |
| Aspergillus | Pythium |
| Azotobacter | Rhizoctonia |
| Bacillus | Rhizopus |
| Cunninghamella | Saccharomyces |
| Fusarium | Sclerotium |
| Mucor | Streptomyces |
| Norcordia | Trichoderma |
| Penicillium | Verticillium |
| Phanerochete | Xanthomonas |

In addition to the above named organisms were also present numerous kinds of free living nematodes, protozoa, algae, yeasts, mites and the larvae of the fungus gnat (Sciara, family Mycetophylidae). Degradation of the raw plant material starts with invasion of the "opportunistic" fungi, Rhizopus, Mucor, Aspergillus and Penicillium, among others. These fungi are followed by Sciara, the bacteria, nematodes, protozoa and algae. A small group of Basidiomycetes representing the fleshy fungi appear next. Finally the Actinomycetes and Pseudomonas species, among others, dominated the composted humic substance.

This U.S. patent teaches that during the decomposition of high nitrogen to carbon ratio plant materials the above ecological succession of microbial inhabitants mutually support and compete with each other and in so doing transform a large number of complex organic carbon bearing chemical substances, including certain soil borne plant pathogens, into harmless end products supportive to higher plant life. The process includes mineralization of the carbon in the contaminating compounds or degradation by cometabolism, or both, induced by the microbial consortia occupying the composted high nitrogen to carbon ratio plant material.

A leguminous crop or other plant of a similar nitrogen content may be substituted for the cotton crop, or its residue, cotton gin trash, providing its carbon:nitrogen ratio be in the range of 10 to 1 to 30 to 1, the higher nitrogen ratios being preferable for accelerated bioremediation of unwanted pathogens. This patent also teaches that for bioremediation of soils to be successful, within reasonable time periods, it is essential that the oxidative microflora, naturally present in and on the high nitrogen to carbon ratio plant materials, be encouraged to increase in both kinds and numbers and that they must be sustained for long periods of time, an example being 3 or 4 months. This objective has been accomplished by the high nitrogen bearing humus provided by said special plant materials.

BIOREMEDIATION OF CONTAMINATED SOILS WITH THE SPECIAL COMPOST

The purpose of the above disclosed procedure is to increase the kinds and numbers of oxidative microorganisms in the original plant remains and to condition or acclimatize them to accept and degrade the unwanted contaminants known or suspected of being present. Residues of DDT, dieldrin and toxaphene are known to be present in some soils along with other aliphatic and aromatic compounds such as the petroleum hydrocarbons and industrial solvents and are remediated by the present invention.

Soil borne plant pathogens such as fungi of the genera Rhizoctonia, Pythium and Fusarium, as well as bacterial and nematode pathogens, are also destroyed by the process of this invention.

EXAMPLE 1

An example is a soil contaminated with diesel fuel. In this example the diesel fuel contaminated soil from a leaky tank was excavated and mixed with cotton gin trash compost using three parts of contaminated soil with one part of cotton gin trash compost by volume. The mix was spread on a level well drained area to a depth of about 18 inches and kept damp and covered with a plastic sheet. Samples of the mix were taken at the start of the incubation period and at time intervals in days for 168 days. The concentration of total petroleum hydrocarbons was reduced from 260 ppm to 10 ppm in 168 days or less (Table 1).

TABLE 1

| Total petroleum fuel hydrocarbons in soil analyzed using EPA method 8015. | | | |
|---|---|---|---|
| Days after mixture with compost | | | |
| 0 | 40 | 104 | 168 |
| 260 ppm | 130 ppm | 46 ppm | 10 ppm |

EXAMPLE 2

In another example soil contaminated with industrial solvents was mixed with cotton gin trash compost using three parts of soil to one part of cotton gin trash compost by volume. Incubation of the mix reduced the total halogenated organic solvents from as much as 650 ppm of 1, 1, 1-trichloroethane to non detectable levels in 125 days or less during early spring weather. (Table 2).

TABLE 2

| Total halogenated organics in soil contaminated by industrial paint solvents analyzed using EPA method 8010. | | |
|---|---|---|
| Original soil mix | | After 125 days Treatment with cotton gin trash compost |
| 1,1 dichloroethane | 150 ppm | ND |
| trans-1,2 dichloroethane | 25 ppm | ND |
| methylene chloride | 110 ppm | ND |
| 1,1,1-trichloroethane | 650 ppm | ND |

ND = none detectable

EXAMPLE 3

In another example we used a mix of sawdust and cotton gin trash compost 1 to 1 by volume as an absorbent for cleaning up spills of diesel fuel, oils, aviation fuel, paint solvents and trichloroethylene. Maximum concentrations up to 20% by volume were absorbed by the sawdust-gin trash compost mix. Immediately after soaking up the solvents a small amount of water was added to compensate for lack of moisture in the dry soils ("suppressive") *Rhizoctonia solani* either made no progress or very little and soon expired. Examples are illustrated in Table 3.

TABLE 3

Suppression of *Rhizoctonia solani* in bioremediated soils cleansed of a group of industrial paint solvents as indicated in Table 2.

Numbers of surviving cotton seedlings, % survival and distance in cm. traveled by *Rhizoctonia solani* in rows of 25 seeds planted in stated soils.

| Days from planting | Remediated field soil[a] | | | Commercial potting soil containing peat, perlite, vermiculite[b] | | | Plant disease infested garden soil[b] | | | Cotton field soil Pythium-Fusarium infested[a] | | |
|---|---|---|---|---|---|---|---|---|---|---|---|---|
| | No. | % | cm | No. | % | cm | No. | % | cm | No. | % | cm |
| 4  | —  | —  | — | 18 | 72 | 1  | —  | —  | —  | —  | —  | — |
| 5  | 9  | 36 | 1 | —  | —  | —  | 13 | 52 | —  | 20 | 84 | 4 |
| 6  | 18 | 72 | 1 | 16 | 64 | 5  | —  | —  | —  | 21 | 84 | 5 |
| 7  | 22 | 88 | 1 | 14 | 56 | 10 | 10 | 40 | 8  | 19 | 76 | 7 |
| 8  | 22 | 88 | 1 | —  | —  | —  | 9  | 36 | 19 | 18 | 72 | 8 |
| 9  | 22 | 88 | 1 | 12 | 48 | 12 | 12 | 48 | 20 | 18 | 72 | 8 |
| 10 | 21 | 84 | 1 | 11 | 44 | 16 | 6  | 24 | 23 | 18 | 72 | 8 |
| 11 | 21 | 84 | 1 | 11 | 44 | 16 | 5  | 20 | 26 | 18 | 72 | 8 |
| 12 | 21 | 84 | 1 | —  | —  | —  | 5  | 20 | 26 | 18 | 72 | 8 |
| 13 | 21 | 84 | 1 | 8  | 32 | 17 | 2  | 8  | 27 | 18 | 72 | 8 |
| 14 | 21 | 84 | 1 | 7  | 28 | 20 | —  | —  | —  | 18 | 72 | 8 |
| 15 | 21 | 84 | 1 | 4  | 16 | 25 | 2  | 8  | 27 | 18 | 72 | 8 |

[a]Original contaminated soil 2 parts (vol.) mixed with composted cotton gin trash 1 part.
[b]Not mixed with composted gin trash.

sawdust which drew moisture from the damp cotton gin trash compost. The purpose being to avoid injuring the contained microorganisms through desiccation. The mixes were incubated during early spring temperatures in the absence of sunlight for 40 to 50 days when barley seeds were planted. Surprisingly, we found better growth of both wheat and barley in a 50 ppm diesel fuel-sawdust-composted gin trash mix than in the non-contaminated mix. While the more volatile portions of the petroleum hydrocarbon soil contaminants undoubtedly evaporated, the less volatile fractions were biodegraded by the microbial consortia present in the humic substrate supporting the growth of the small grains. The roots of the small grains themselves also supported a special microflora which assisted in the cleansing action. It is for this reason plants were grown on soils being remediated by the method or process disclosed herein.

EXAMPLE 4

This patent also discloses that the above described process or method for the bioremediation of chemically contaminated soils by means of cotton gin waste compost or related plant debris, also cleanses soils of the soil borne plant pathogen, *Rhizoctonia solani*, and similar plant disease causing microorganisms. Such soils as listed in tables 1 and 2 above were placed in planters and seeded with cotton on greenhouse benches. Ten to 20 grams of soil infested with the soil borne plant pathogen *Rhizoctonia solani*, a virulent parasite of cotton seedlings, was then introduced into one end of the planter boxes containing the biologically remediated soils seeded with cotton. Both steamed and non steamed normal soils were included and treated in the same manner serving as checks. Within 4 to 5 days at soil temperatures of 24° to 26° C. the cotton seedlings began to emerge from the soil and the soil borne plant pathogen, *Rhizoctonia solani*, began moving into the seedlings destroying one after the other in the normal ("conductive") soils, steamed or not; moving forward at a rate of about 1.7 cm. per day. In the biologically remediated Table 3 shows the biologically remediated soil which originally contained 190 ppm 1, 1-dichloroethane, 25 ppm trans-1, 2-dichloroethane, 110 ppm methylene chloride and 650 ppm, 1, 1, 1-trichloroethane was cleansed during a time period of 125 days and that the cleansed soil did not support the growth of the soil borne plant pathogen *Rhizoctonia solani*. Table 3 also shows the commerical potting soil and garden soil used did support *Rhizoctonia solani* and allowed only 16 and 8%, respectively, of the seedlings to survive. *Rhizoctonia solani* moved through these non suppressive soils at a rate of about 1.75 cm. per day destroying seedlings. Growth of the cotton seedlings in the bioremediated soil was approximately twice those of those remaining in the commercial potting soil after 15 days. Table 3 also shows that a cotton field soil naturally infested with the soil borne plant pathogens Pythium and Fusarium were both suppressed 72% after 8 days in contact with the special compost.

The examples cited in Table 3 were extended to 72 soil samples almost all of which were conducive to the support of plant disease causing agents to some degree. Only those soils treated or mixed with the high nitrogen to carbon ratio plant materials, as described herein, were in the 60 to 100% disease suppressive category.

Of the 72 soils tested for suppression of the soil borne plant pathogen *Rhizoctonia solani*, using the method described above, and as illustrated in Table 3 we selected soils known to be infested with other soil borne plant pathogens including *Fusarium vasinfectum* and *Pythium ultimum*, both being pathogens of cotton and numerous other plant species. None of the above identified plant pathogens survived for more than a few days in a 1 to 1 (vol.) mix of the infested soil containing the special cotton gin waste compost.

Within the above group of 72 soils were 18 commercial horticultural potting soils collected from Florida to California. Several of these soils were formulations of composted sewage sludge, garbage, vermiculite, perlite, bark, peat moss, food processing plant wastes and similar unwanted substances. By increasing potting soil to 1 to 1 (vol.) the degree was also increased while time required was decreased.

Inasmuch as the above described processes are subject to various modifications, given this disclosure, it is intended that the above examples are illustrative only, and that the scope of the invention should be limited only by the following claims.

We claim:

1. A process for cleansing soil contaminated with a hydrocarbon or chlorinated hydrocarbon chemical comprising the steps:
   composting plant material having a carbon:nitrogen ratio of 10:1 to 30:1,
   mixing said contaminated soil with a suitable amount of the composted plant material,
   allowing the mixture to stand for a suitable time at ambient temperature until the contaminated soil is cleansed.

2. The proces of claim 1 wherein the composting step further comprises the steps:
   arranging the plant material in windows,
   wetting the windrows to bring the moisture content to 50-90% based on dry weight of the plant material with an aqueous solution of 50-1000 ppm carbohydrate based on dry weight of the plant material and 50-500 ppm soluble iron,
   mixing the windrows, and
   allowing the windrows to stand with periodic addition to water and mixing until individual plant parts are no longer easily identified.

3. The process of claim 1 wherein the source of the plant material is selected from the group consisting of cotton and legumes.

4. The process of claim 1 wherein the plant material is cotton gin trash.

5. The process of claim 1 wherein the plant material is alfalfa hay.

6. The process of claim 1 wherein the hydrocarbon and chlorinated hydrocarbon chemicals are selected from the group consisting of residues of DDT, dieldrin, toxaphene, 1,1,1-trichloroethane, 1,1 dichloroethane, trans-1,2 dichloroethene, trichloroethylene, methylene chloride, and petroleum fuel hydrocarbons.

7. The process of claim 1 wherein contaminated soil is mixed with the composted plant material at a ratio of about 3:1 by volume.

8. The process of claim 1 further comprising the step:
   mixing the composted plant material with a component of potting soil selected from the group consisting of peat, sawdust, vermiculite, perlite, sewage sludge, and solid waste compost.

9. The process of claim 1 further comprising the step:
   adding to the plant material hydrocarbon or chlorinated hydrocarbon at a concentration of about 50 ppm based on the dry weight of the plant material.

10. A process for absorbing and decontaminating a hydrocarbon or chlorinated hydrocarbon spill comprising the steps:
    composting plant material having a carbon:nitrogen ratio of 10:1 to 30:1,
    mixing the composted plant material with about an equal volume of sawdust to form an absorbant,
    mixing the absorbant with up to 20% by volume of spilled hydrocarbon or chlorinated hydrocarbon, and
    allowing the mixture to stand for a suitable time at ambient temperature until the hydrocarbon or chlorinated hydrocarbon is decontaminated.

11. The process of claim 10 wherein the hydrocarbon or chlorinated hydrocarbon is selected from the group consisting of diesel fuel, oil, gasoline, aviation fuel, paint solvent, and trichloroethylene.

12. The process of claim 10 further comprising the step:
    adding to the plant material hydrocarbon or chlorinated hydrocarbon at a concentration of about 50 ppm based on dry weight of the plant material.

13. A process for cleansing soil contaminated with hydrocarbon and chlorinated hydrocarbon chemicals comprising the steps:
    composting cotton gin trash by a process comprising the steps:
    arranging the cotton gin trash in windrows,
    wetting the windrows to bring the moisture content to 50-90% based on dry weight of the cotton gin trash with an aqueous solution of 50-1000 ppm carbohydrate based on dry weight of the plant material and 50-500 ppm soluble iron,
    mixing the windrows, and
    allowing the windrows to stand with periodic addition of water and mixing until individual plant parts are no longer easily identified,
    mixing about three parts by volume contaminated soil with one part by volume of the composted cotton gin trash, and
    allowing the mixture to stand for a suitable time at ambient temperature until the contaminated soil is cleansed.

* * * * *